US010002637B2

(12) United States Patent
Narita et al.

(10) Patent No.: US 10,002,637 B2
(45) Date of Patent: Jun. 19, 2018

(54) MAGNETIC RECORDING AND REPRODUCING DEVICE AND METHOD OF CONTROLLING MAGNETIC RECORDING AND REPRODUCING DEVICE

(71) Applicant: Kabushiki Kaisha Toshiba, Tokyo (JP)

(72) Inventors: Naoyuki Narita, Fujisawa Kanagawa (JP); Kenichiro Yamada, Tokyo (JP); Masayuki Takagishi, Tokyo (JP); Tomoko Taguchi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days. days.

(21) Appl. No.: 15/444,375

(22) Filed: Feb. 28, 2017

(65) Prior Publication Data

US 2018/0090167 A1   Mar. 29, 2018

(30) Foreign Application Priority Data

Sep. 26, 2016   (JP) .................................. 2016-187378

(51) Int. Cl.
   *G11B 5/09*   (2006.01)
   *G11B 20/10*   (2006.01)

(52) U.S. Cl.
   CPC .......... *G11B 20/10481* (2013.01); *G11B 5/09* (2013.01)

(58) Field of Classification Search
   None
   See application file for complete search history.

(56) References Cited

U.S. PATENT DOCUMENTS

| 5,307,212 A * | 4/1994 | Tagiri ................. G11B 5/09 360/46 |
| 6,493,161 B1 | 12/2002 | Elliott et al. |
| 7,027,251 B1 * | 4/2006 | Darragh .............. G11B 5/3136 360/75 |
| 7,575,820 B2 * | 8/2009 | Silva ..................... G11B 5/02 360/46 |
| 2001/0043419 A1 | 11/2001 | Osaki |

(Continued)

FOREIGN PATENT DOCUMENTS

| JP | 2004-5852 | 1/2004 |
| JP | 2004-30730 | 1/2004 |

(Continued)

*Primary Examiner* — Peter Vincent Agustin
(74) *Attorney, Agent, or Firm* — Finnegan, Henderson, Farabow, Garrett & Dunner, L.L.P.

(57) ABSTRACT

According to one embodiment, a magnetic recording and reproducing device which has a magnetic recording medium, a magnetic head, and a recording current output unit. Magnetic data is recorded on the magnetic recording medium. The magnetic head records the magnetic data on the magnetic recording medium. The recording current output unit supplies a recording current to the magnetic head so as to magnetize the magnetic head. A waveform of the recording current has a first slope for a first period to record data of first information continuously and a second slope for a following second period to switch the data to data of second information and to record the data of the second information. The first slope and the second slope are different from each other.

13 Claims, 15 Drawing Sheets

(56) References Cited

U.S. PATENT DOCUMENTS

| | | | |
|---|---|---|---|
| 2003/0067696 A1* | 4/2003 | Maeda | G11B 20/10009 360/29 |
| 2003/0189778 A1* | 10/2003 | Elliott | G11B 20/10009 360/29 |
| 2003/0223143 A1 | 12/2003 | Fujiwara et al. | |
| 2003/0234997 A1 | 12/2003 | Ikekame et al. | |
| 2006/0139787 A1* | 6/2006 | Ohinata | G11B 5/465 360/46 |
| 2007/0153410 A1* | 7/2007 | Hashizume | G11B 5/465 360/66 |
| 2007/0165320 A1* | 7/2007 | Benakli | G11B 5/02 360/68 |
| 2008/0002267 A1* | 1/2008 | Jang | B82Y 10/00 360/46 |
| 2009/0009903 A1 | 1/2009 | Lee et al. | |
| 2009/0116134 A1 | 5/2009 | Howley et al. | |
| 2013/0235485 A1* | 9/2013 | Livshitz | G11B 20/10009 360/40 |
| 2013/0308222 A1* | 11/2013 | Dina | G11B 5/09 360/55 |
| 2014/0126077 A1* | 5/2014 | Contreras | G11B 5/02 360/46 |
| 2015/0213813 A1* | 7/2015 | Lammers | G11B 20/10018 360/46 |

FOREIGN PATENT DOCUMENTS

| | | |
|---|---|---|
| JP | 3924113 | 3/2007 |
| JP | 4739344 | 5/2011 |
| JP | 5433167 | 12/2013 |

\* cited by examiner

MAGNETIC RECORDING AND REPRODUCING DEVICE AND METHOD OF CONTROLLING MAGNETIC RECORDING AND REPRODUCING DEVICE

CROSS-REFERENCE TO RELATED APPLICATION

This application is based upon and claims the benefit of priority from the prior Japanese Patent Application No. 2016-187378, filed on Sep. 26, 2016, the entire contents of which are incorporated herein by reference.

FIELD

Embodiments described herein relate generally to a magnetic recording and reproducing device and a method of controlling a magnetic recording and reproducing device.

BACKGROUND

In a magnetic recording and reproducing device, information is recorded on a magnetic storage medium such as a hard disk drive (HDD). In such a magnetic recording and reproducing device, increase of a recording density is desired.

DETAILED DESCRIPTION

Figure 1A:
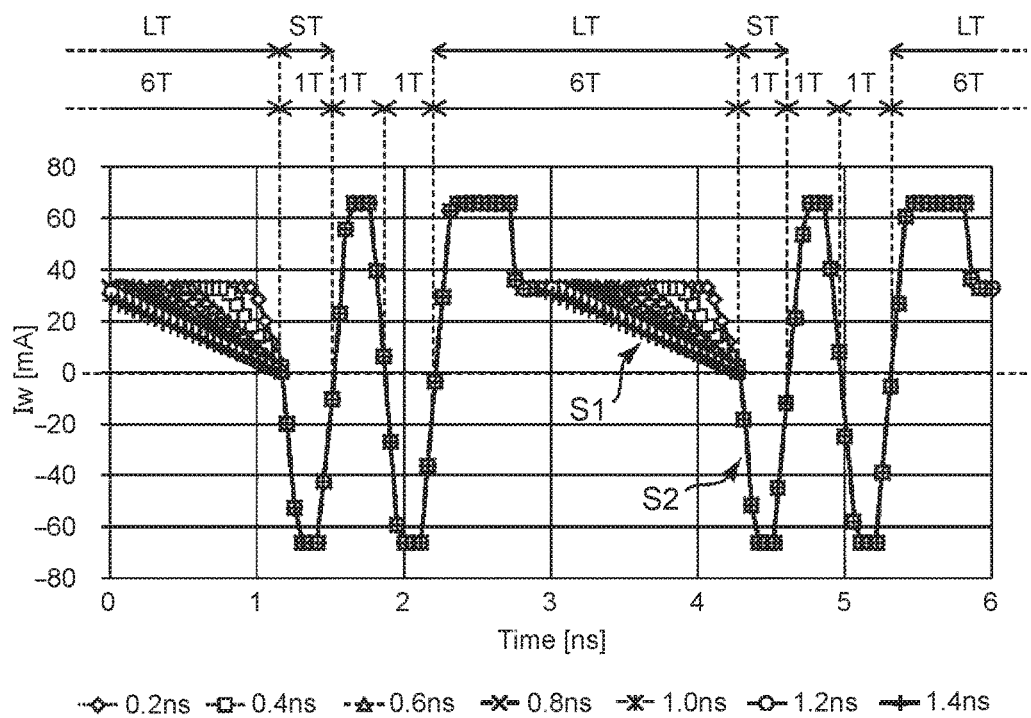
FIGS. 1A and 1B are diagrams which respectively illustrate a recording current waveform and a schematic configuration of a magnetic recording and reproducing device according to one embodiment using the recording current waveform.

According to one embodiment, a magnetic recording and reproducing device which has a magnetic recording medium, a magnetic head, and a recording current output unit. Magnetic data is recorded on the magnetic recording medium. The magnetic head records the magnetic data on the magnetic recording medium. The recording current output unit supplies a recording current to the magnetic head so as to magnetize the magnetic head. A waveform of the recording current has a first slope for a first period to record data of first information continuously and a second slope for a following second period to switch the data to data of second information and to record the data of the second information. The first slope and the second slope are different from each other.

Hereinafter, further embodiments will be described with reference to the drawings.

In the drawings, the same reference numerals denote the same or similar portions respectively.

The drawings are schematically or conceptually illustrated, and a relation between the thickness and the width of each portion, a ratio between the sizes of portions etc. are not necessarily the same as actual ones. In addition, in the drawings, in a case where the same portions are illustrated, the size and the ratio of the portions may be differently illustrated.

A magnetic recording and reproducing device according to an embodiment will be described with reference to FIGS. 1A and 1B.

Figure 1B:
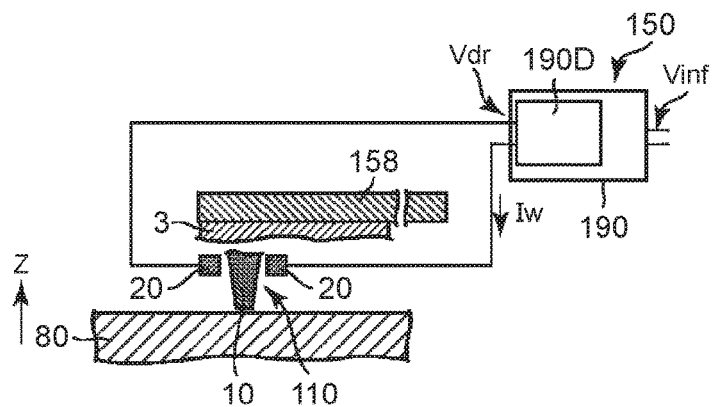

The magnetic recording and reproducing device according to the embodiment is provided with a magnetic recording medium 80, a magnetic head 110, and a recording current output unit (an output driver) 190 as shown in FIG. 1B.

Magnetic data is recorded on the magnetic recording medium. The magnetic head 80 records magnetic data on the magnetic recording medium 80 in accordance with a recording current. The recording current output unit 190 supplies the recording current to the magnetic head 80.

The waveform of the recording current has a first slope S1 positioned before a transition point at which the recording current is approximately zero, and a second slope S2 positioned after the transition point. The value of the first slope S1 and the value of the second slope S2 are different from each other.

When the absolute value of the first slope S1 of the recording current waveform and the absolute value of the second slope S2 are compared with each other, the first slope S1 is smaller than the second slope S2.

FIG. 1A is a diagram which illustrates a recording current waveform used in the magnetic recording and reproducing device according to the embodiment. In FIG. 1A, "Iw" represents a recording current value.

It is known that it may become difficult to record data when the data to be recorded on a magnetic recording medium has a specific pattern described below. In the current waveform, a period corresponding to one bit of data to be recorded on a magnetic recording medium is set as "1T".

In a case where data of first information "1" is recorded on a magnetic recording medium 80 continuously in a long period, for example, in a period of 6T, and subsequently the data is switched to data of second information "0" to record the data on the magnetic recording medium 80, when a period in which the second information is to be recorded is 1T the quality of data recording may be degraded. Such a phenomenon is called "1T-missing", for example.

In the recording current waveform illustrated in FIG. 1A, in a first period LT in which a plurality of data the first information "1" is recorded continuously for a long time, the first slope S1 is included. The first period LT is 6T, for example.

Subsequently, the data is switched to data of the second information "0" and the latter data is recorded on the magnetic recording medium 80, in a second period ST. In the second period ST employing 1T, the second slope S2 is included.

The continuous interval of the first information in the first period is longer than that of the second information in the second period.

In the above case, after data of the first information "1" is continuously recorded for a long time, subsequently the data is switched to data of the second information "0" and the latter data is recorded, as an example of recording data, but the first information may be "0", and the second information may be "1".

The magnetic recording and reproducing device according to the embodiment includes a recording current control circuit 232 of FIG. 11 to produce a recording current for recording a recording data pattern on a magnetic recording medium, which will be described below. The recording current control circuit 232 controls values of slopes of a falling portion S1 and a rising portion S2 with respect to a time axis at transition points of a recording current waveform which are denoted using a dotted line in FIG. 1A. The falling portion S1 and the rising portion S2 correspond to a "fall" and a "rise" defined below, respectively.

In a transition area accompanied by polarity inversion of the recording current at a time of recording a specific recording data pattern, when a point at which the recording current is approximately zero i.e. a zero point is set as a center, a temporal change which goes toward the zero point is defined as a "fall" and a temporal change which goes away from the zero point is defined as a "rise". Thus, the "fall" and the "rise" are not defined by a sign of the temporal change amount of the recording current.

FIG. 1B is a schematic diagram which illustrates an example of the schematic configuration of a magnetic recording and reproducing device using the recording current waveform illustrated in FIG. 1A.

As illustrated in FIG. 1B, the magnetic recording and reproducing device 150 according to the embodiment includes the magnetic head (a magnetic recording and reproducing head) 110, the magnetic recording medium 80, and the output driver 190D as described above. The magnetic head 110 is provided with a magnetic pole 10 (principal magnetic pole) and a coil 20. The magnetic head 110, for example, is disposed in a head slider 3. The head slider 3 is attached to an end portion of a head gimbal assembly 158.

The magnetic head 110 is arranged to face the magnetic recording medium 80. A direction from the magnetic recording medium 80 toward the magnetic head 110 is a Z-axis direction. Recording information is recorded on the magnetic recording medium 80 by using the magnetic head 110.

The output driver 190D is electrically connected to the coil 20. A recording current Iw is supplied from the output driver 190D to the coil 20. According to the recording current Iw flowing through the coil 20, a recording magnetic field is generated from the magnetic pole 10. The recording magnetic field is applied to the magnetic recording medium 80, and the magnetization of the magnetic recording medium 80 is changed. According to the change in the magnetization, recording information is recorded on the magnetic recording medium 80.

In the magnetic recording and reproducing device 150, a signal processing unit 190 is provided. The output driver 190D is an output unit provided in the signal processing unit 190. Recording information Vinf is supplied to an input unit provided in the signal processing unit 190. The recording information Vinf is information to be recorded.

Figure 2:
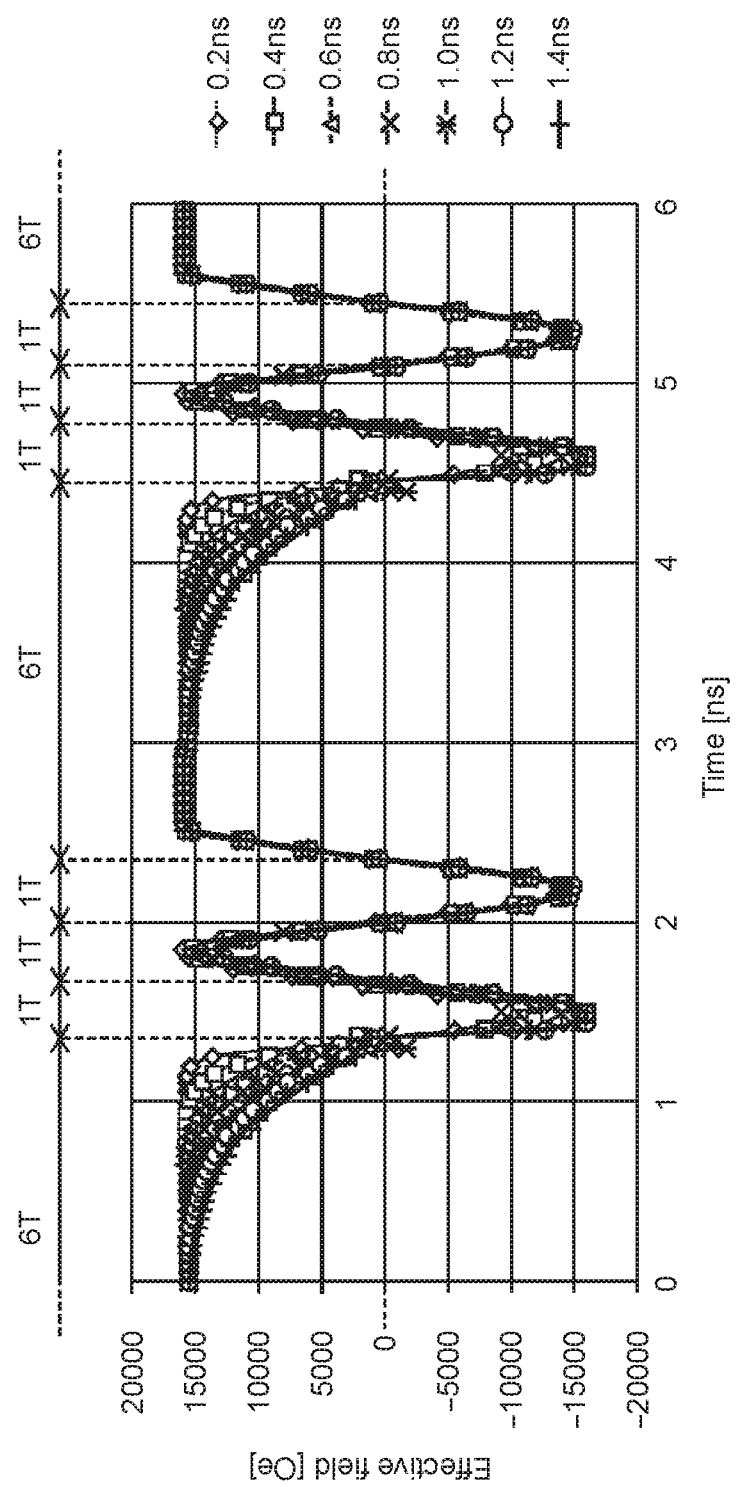
FIG. 2 is a diagram which illustrates a recording magnetic field waveform of a case where the recording current waveform is used.

FIG. 2 is a diagram which illustrates a recording magnetic field waveform generated when the recording current waveform according to the embodiment is used.

FIG. 2 illustrates a generated recording magnetic field obtained by a micro magnetics simulation using the recording current waveform illustrated in FIG. 1A. In the simulation, a fall time S1$t$ is changed in the range of 0 ns to 1.4 ns, and a rise time S2$t$ is fixed to 0.1 ns.

Figure 3:
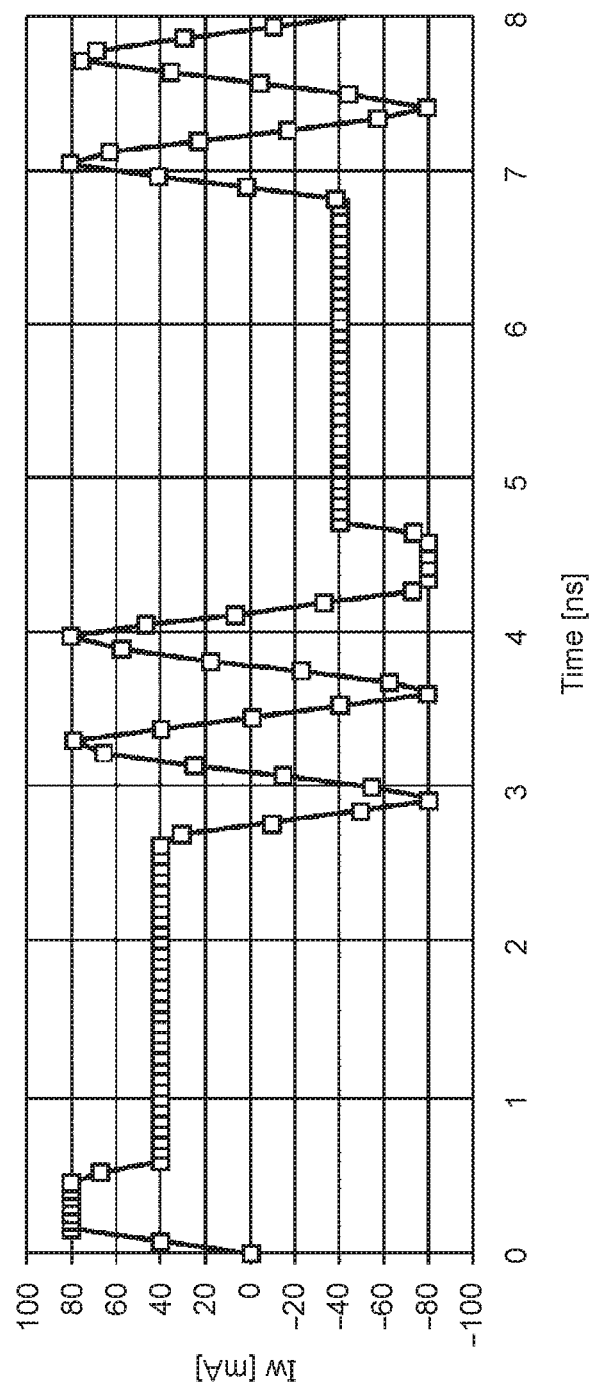
FIG. 3 is a diagram which illustrates an example of a recording current waveform of a magnetic recording and reproducing device according to a first comparative example.

FIG. 3 is a diagram which illustrates an example of a recording current waveform of a magnetic recording and reproducing device according to a first comparative example.

The first comparative example is a general typical recording current waveform including an overshoot. The recording current waveform has approximately equal maximum values regardless of a period of a recording bit. The data transmission rate is 2.5 Gbps. In order to verify the effect, a pattern of "6T-1T-1T" was used as a data pattern.

Figure 4:
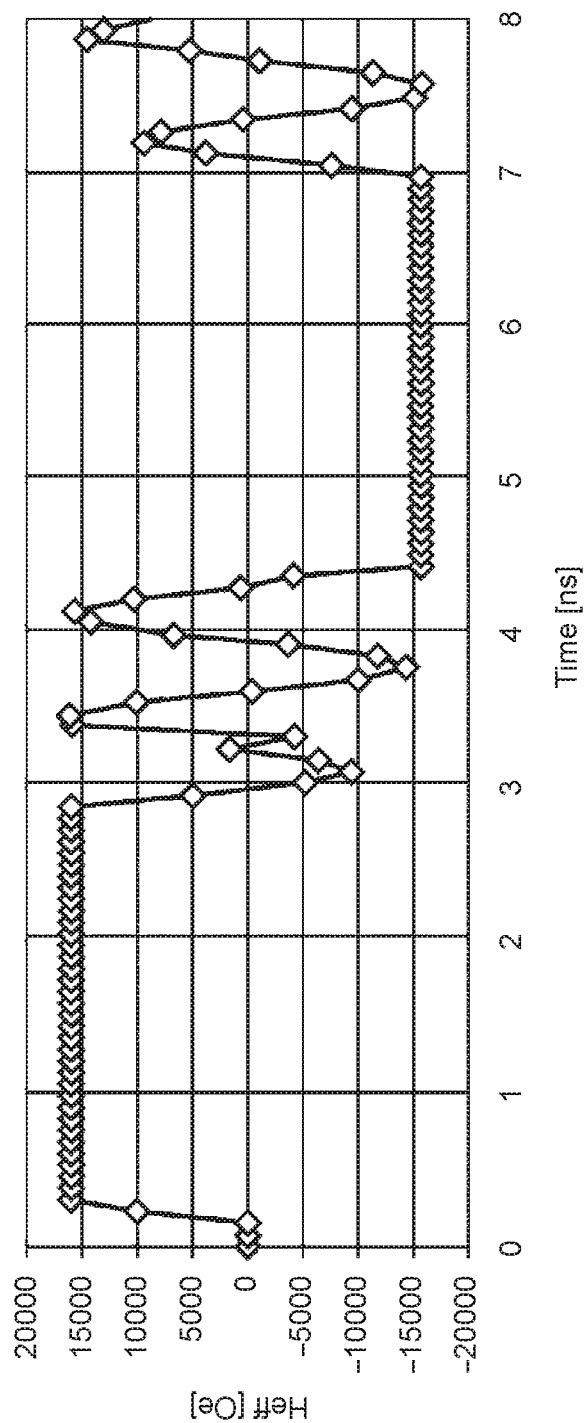
FIG. 4 is a diagram which illustrates a recording magnetic field waveform of a case where the recording current waveform illustrated in FIG. 3 is used.

FIG. 4 illustrates a recording magnetic field inside a recording medium obtained by a micro magnetics simulation when a recording current waveform according to the first comparative example illustrated in FIG. 3 is used.

In the simulation of FIG. 4, a position downward by 15 nm from a floating surface of a recording head is set as a center position of the magnetic recording medium 80. The intensity of the recording magnetic field was observed at the center position. It can be understood that the intensity of a recording magnetic field of a pattern portion having a short period immediately after recording a pattern having a long period is smaller by about 20 to 30% than that of any other bits when the current waveform according to the first comparative example is used, Such a smaller intensity of the recording magnetic field represents that the magnetization of an inside of the recording head is fixed due to presence of a long-period pattern portion immediately before a short-period pattern portion so that the responsiveness of the recording head is degraded. By the degradation of the intensity of the recording magnetic field of the short-period pattern portion, lowering of on-track recording quality occurs. In order to compensate the degradation of the responsiveness of the recording magnetic field, phase adjustment for compensating the non-linearity depending on the length of the recording pattern is generally performed in addition to adjustment of the recording current for increasing the recording current of the short-period pattern portion, for example.

Figure 5:
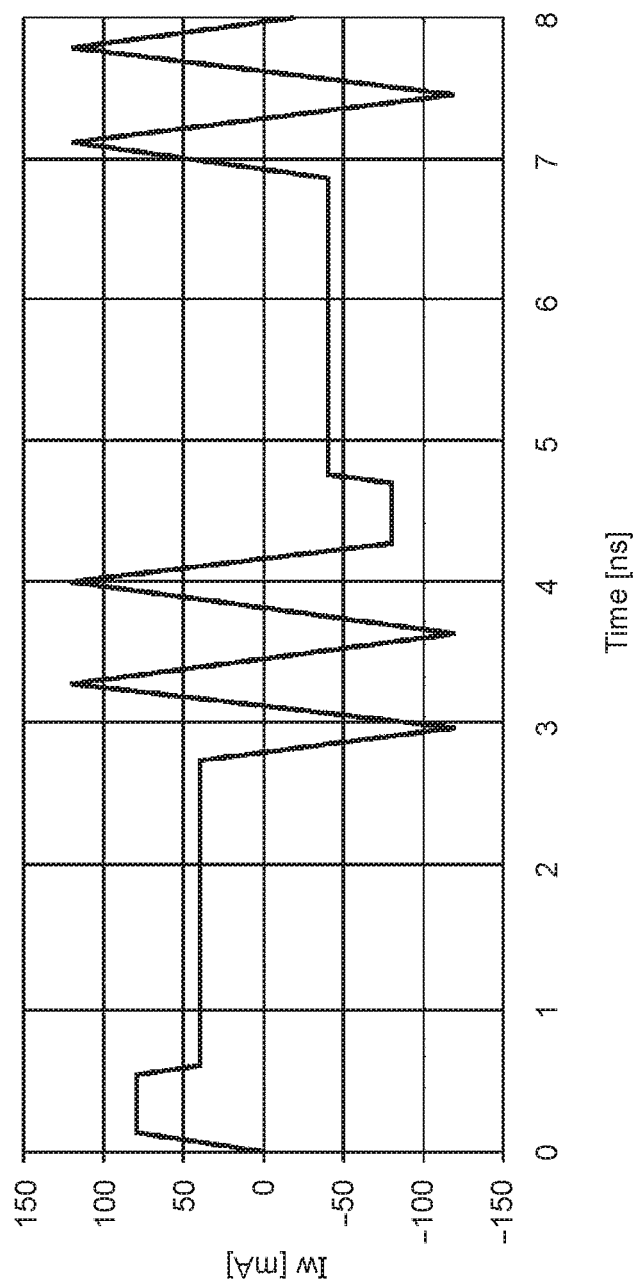
FIG. 5 is a diagram which illustrates an example of a recording current waveform the amplitude of which is adjusted and which is used in the magnetic recording and reproducing device according to the first comparative example.
Figure 6:
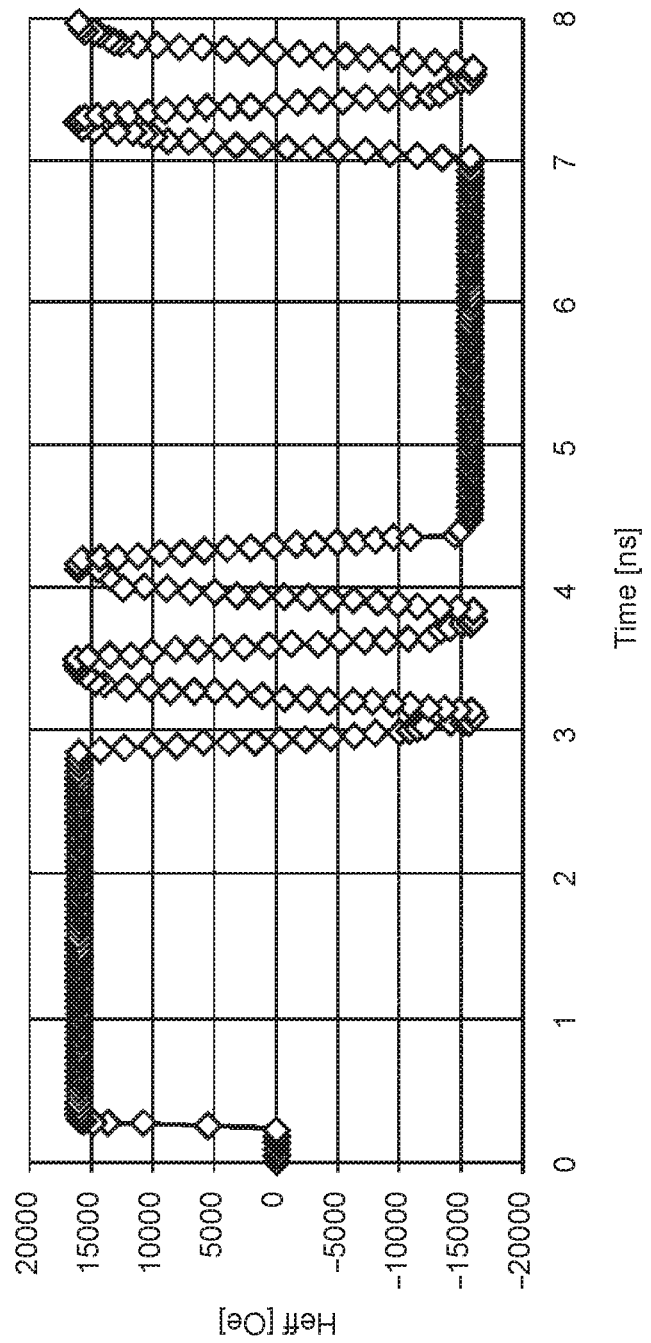
FIG. 6 is a diagram which illustrates a recording magnetic field waveform of a case where the recording current waveform illustrated in FIG. 5 is used.

FIG. 5 illustrates another example of the recording current waveform which is used in the magnetic recording and reproducing device according to the first comparative example. The amplitude of the example is adjusted. FIG. 6 illustrates a recording magnetic field waveform based on a recording current waveform, of which the amplitude is adjusted, used in the magnetic recording and reproducing device according to the first comparative example illustrated in FIG. 6.

While lowering of the intensity of the recording magnetic field is improved by performing the adjustment of the recording current, a leakage magnetic field in a track direction increases in accordance with an increase in the recording current. Accordingly a problem that the recording density in the track direction decreases occurs.

Figure 7:
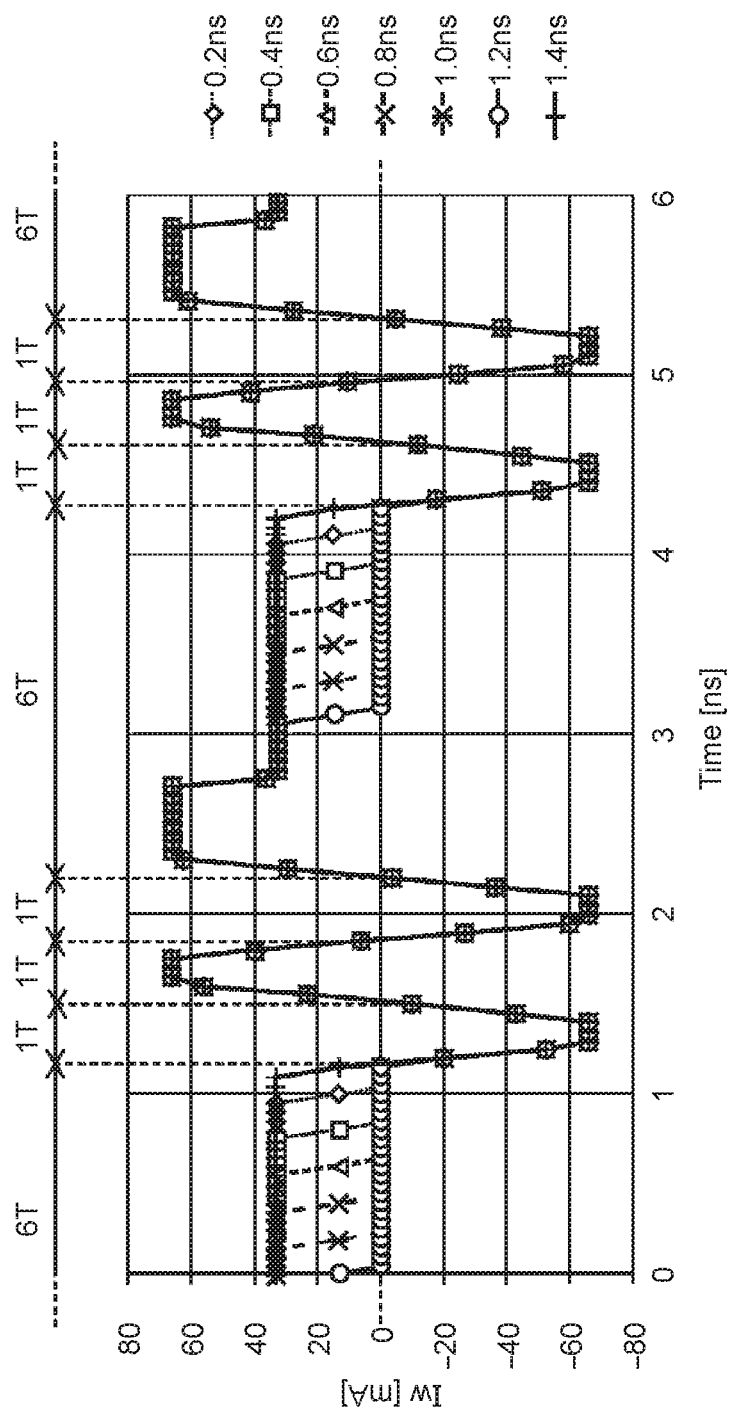
FIG. 7 is a diagram which illustrates an example of a recording current waveform of a magnetic recording and reproducing device according to a second comparative example.

FIG. 7 is a diagram which illustrates an example of a recording current waveform of a magnetic recording and reproducing device according to a second comparative example.

Figure 8:
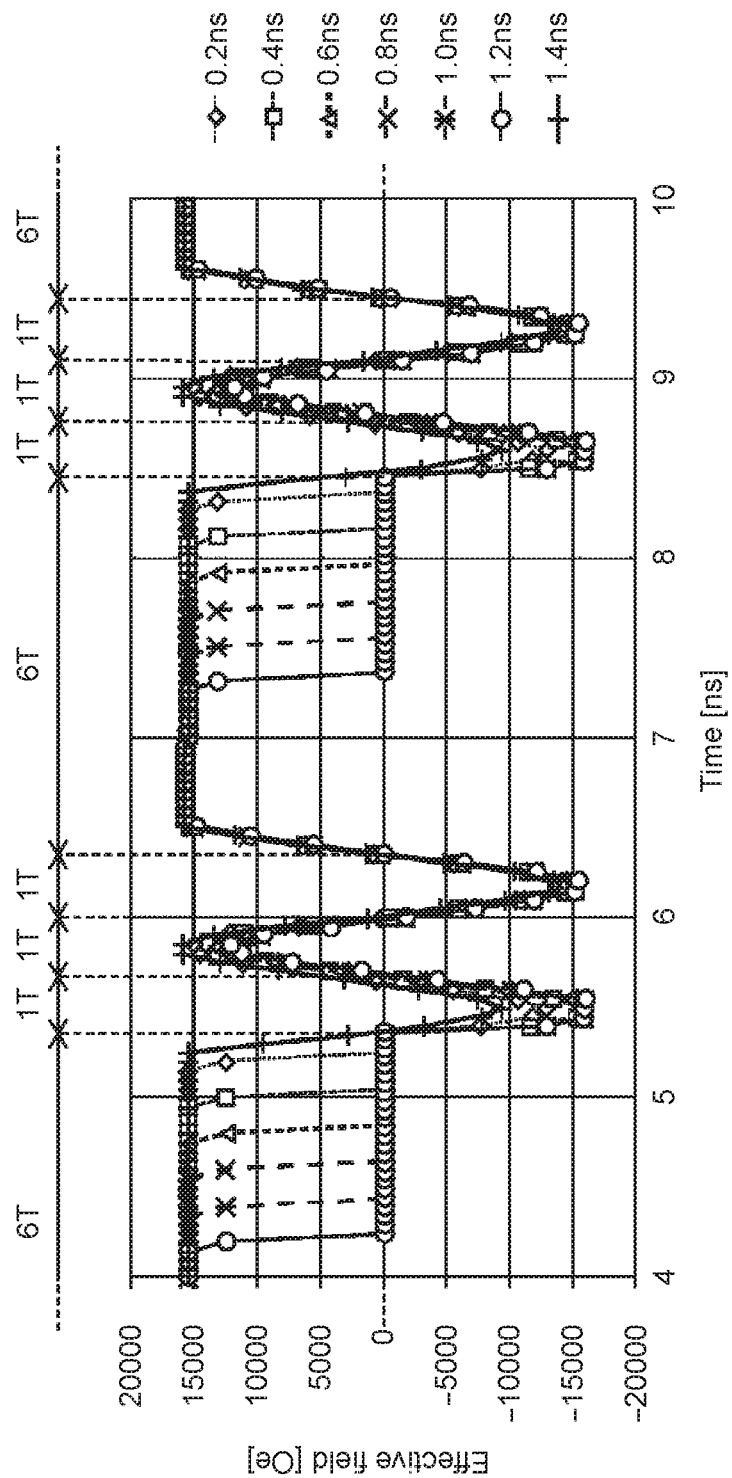
FIG. 8 is a diagram which illustrates a recording magnetic field waveform of a case where the recording current waveform illustrated in FIG. 7 is used.

FIG. 8 is a diagram which illustrates a recording magnetic field waveform when the recording current waveform of the magnetic recording and reproducing device according to the second comparative example is used.

The recording current waveform illustrated in FIG. 7 sows a case that parts of a recording current are decreased by a predetermined level. In the second comparative example, an attenuation time of the recording current is set as 0 ns to 1.4 ns which are the same as that of the embodiment in order to compare with the embodiment.

Figure 9:
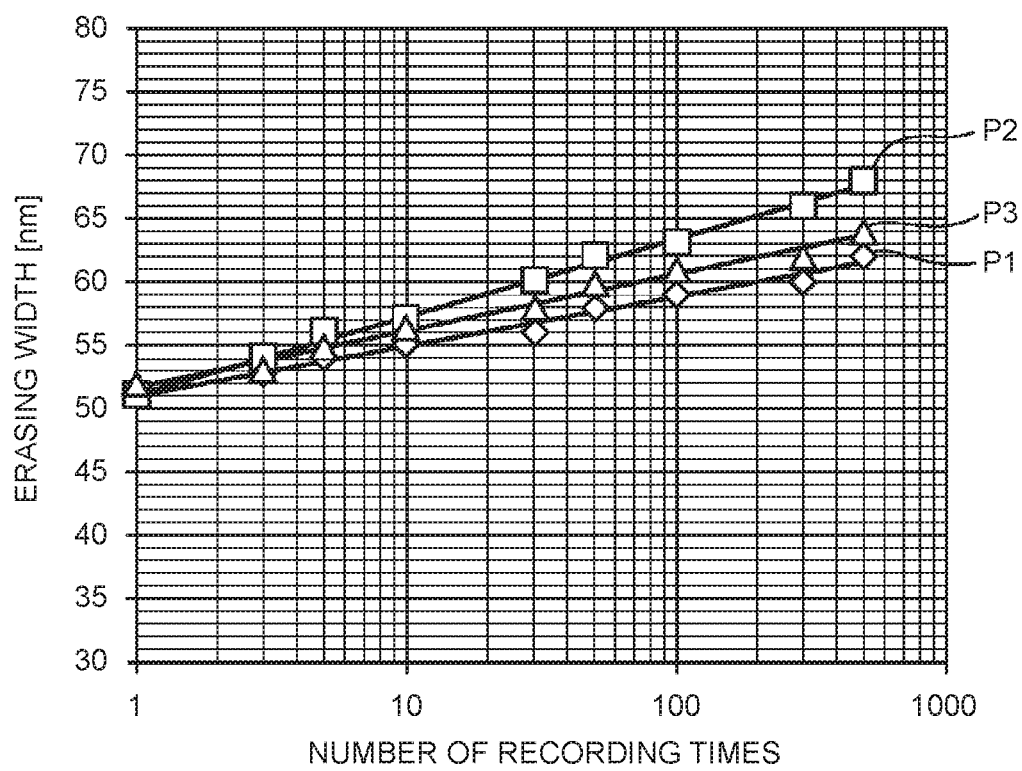
FIG. 9 is a diagram which illustrates the degrees of degradation of off-track densities caused by amplitude adjustment in the magnetic recording and reproducing devices according to the first and second comparative examples and the embodiment.

FIG. 9 shows graphs which illustrate degradation of off-track densities by amplitude adjustment in the magnetic recording and reproducing devices of the first and the second comparative examples and the embodiment respectively. In FIG. 9, "erasing widths" defined below are denoted to show representative values of the degradation.

In FIG. 9, the case of the first comparative example is denoted by P1. The case of the second comparative example in which a recording current value of a short-period pattern is increased by amplitude adjustment is denoted by P2. The case of the embodiment is denoted by P3. FIG. 9 shows a result of the dependency of the erasing width on the number of recording times which is obtained by a simulation for each case.

The erasing width is defined as a width of an initial pattern which is erased when a recording magnetic field based on a recording current passes in a case that a uniform pattern of 2T is given as the initial pattern. FIG. 9 shows a performance of a recording head which can provide a small leakage magnetic field and a high track density as the slopes of the graphs with respect to the number of recording times becomes small. According to FIG. 9, it can be understood that, in the case P2 in which the recording current is increased in a short-period pattern portion, a leakage magnetic field from the recording head is increased by increasing the recording current in part since the slope with respect to the number of recording times is largest. It is disadvantageous for a high-density track while the recording quality of on-track is improved.

In the case P3 showing the embodiment, a current change rate i.e. a value of the slope of a falling portion of a pattern directly before the above pattern is set to be smaller than that of the rising portion of the above pattern, and a recording current for recording a pattern is not increased.

At this time, as illustrated in FIG. 2, similarly to the case of the first comparative example in which the recording current is increased after data switching as illustrated in FIG. 5, it can be understood that the intensity of the recording magnetic field of the short-period pattern portion is improved. In addition, in the case P3 of the embodiment, as illustrated in FIG. 9, compared to the case P2 of the second comparative example in which the recording current of the short-period pattern portion is increased, the recording current amount is relatively decreased, and accordingly the value of the slope of the erasing width with respect to the number of recording times is decreased. Accordingly, in the case P3 of the embodiment, the responsiveness can be improved while high track resolution is maintained.

Figure 10:
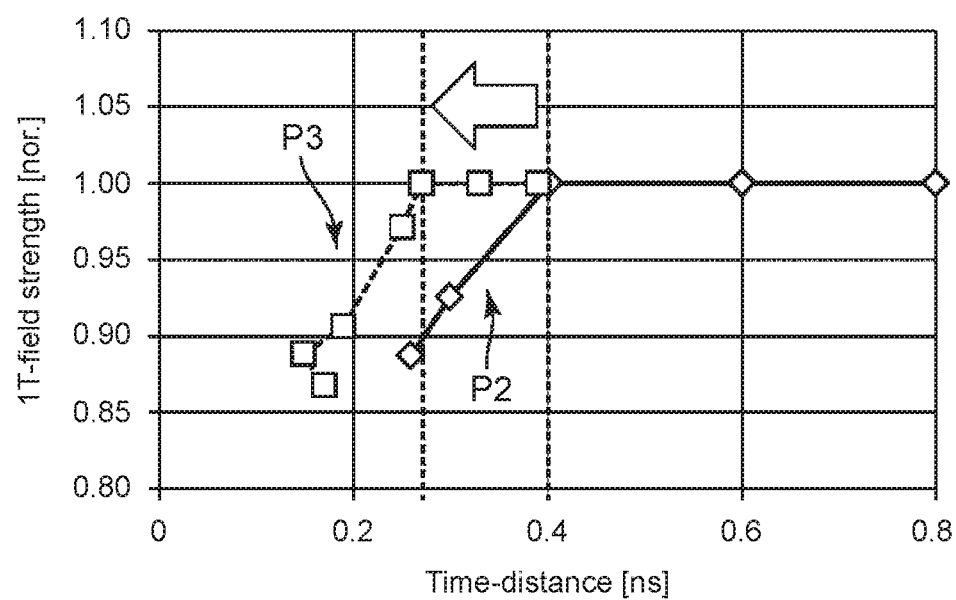
FIG. 10 is a diagram which illustrates a relation between a magnetization undefined area and the effect of improvement of responsiveness of a magnetic head in the magnetic recording and reproducing device according to the embodiment.

FIG. 10 is a diagram which illustrates a relation between a "magnetization undefined area" defined below and the effect of improvement of responsiveness of a magnetic head in the magnetic recording and reproducing device according to the embodiment.

FIG. 10 illustrates a result of a comparison between the case P3 of the embodiment and the case P2 of the second comparative example. In FIG. 10, the horizontal axis is a time distance. The time distance in which the absolute value of the intensity of the recording magnetic field becomes a saturated magnetic field 13 kOe from an inversion nucleation generating magnetic field 8 kOe in the magnetic recording medium is defined as a "magnetization undefined area". Generally, from the viewpoint of on-track recording quality, the value of the time distance in the horizontal axis is desirably small. In FIG. 10, the vertical axis is a maximum magnetic field intensity (strength) of a short-period portion of 1T which is normalized using a maximum magnetic field intensity of a long-period portion. As the value in the vertical axis becomes close to "1", the responsiveness of the recording head is better.

As can be understood from FIG. 8, also in a case where the recording current waveform as illustrated in FIG. 7 is used for the recording current of the magnetic recording and reproducing device according to the second comparative example, the intensity of the recording magnetic field of the short-period portion is improved. However, as illustrated in FIG. 7, it can be understood that a sudden decrease in the intensity of the recording magnetic field occurs in an area for which the recording current is decreased. In such an area in which the intensity of the recording magnetic field is insufficient, a magnetization undefined area in which the magnetization direction of the magnetic recording medium is not uniquely determined is generated, and a noise component of a long period increases greatly.

On the other hand, in a case where the recording current waveform according to the embodiment as illustrated in FIG. 1A is used, degradation of the recording magnetic field in an area in which the recording current is decreased is greatly suppressed as illustrated as the case P3 in FIG. 9, compared to the case P2 of the second comparative example. As a result, by using the recording current waveform of the embodiment, on-track recording quality can be secured to be higher than that of the second comparative example, and a higher recording density can be realized.

A better effect of adjustment of the slope of the recording current at a transition point according to the embodiment can be expected in a case where the degradation of the responsiveness of the recording head depending on a specific pattern such as a short-period portion following a long-period portion is compensated. Accordingly, it is desirable to provide a mechanism for detecting a predetermined recording pattern including a pattern of a short period following another pattern of a long period having a predetermined length in a data pattern to be recorded on a magnetic recording medium and to be able to set the slope of the recording current according to the recording pattern. The other examples of a combination of a recording pattern of a long period and another pattern of a short period following the long period are "11T-1T", "10T-1T", "9T-1T", "8T-1T", "7T-1T", "6T-1T", "5T-1T" and "11T-2T", "10T-2T", "9T-2T", "8T-2T", "7T-2T", "6T-2T", and "5T-2T".

The adjustment of the slope of the recording current at the transition point of the recording current as in the embodiment is a measure for securing linearity of the recording pattern. It is desirable to achieve optimization of the recording magnetic field by adjusting the slope of the recording current as one of the parameters for adjusting the recording current, and by combining the adjustment of the slope with another measure for adjusting the recording magnetic field by controlling the amplitude and the phase of the recording current in accordance with characteristics of the recording head. Such optimization makes it possible to perform recording of a further higher recording density.

Figure 11:
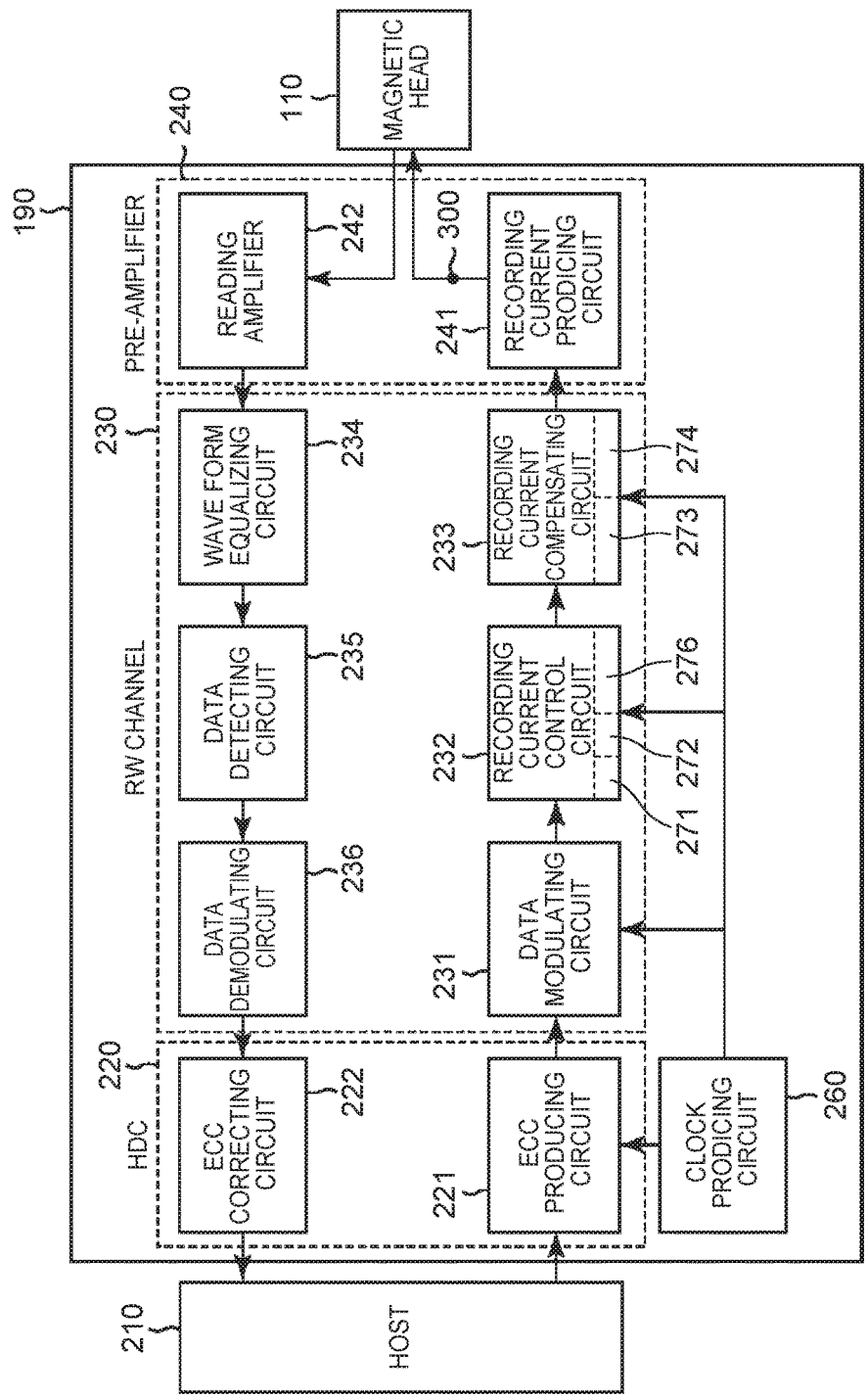
FIG. 11 is a block diagram which illustrates an example of the circuit configuration of the magnetic recording and reproducing device according to the embodiment.

FIG. 11 is a block diagram which illustrates an example of the circuit configuration of the magnetic recording and reproducing device according to the embodiment.

A host 210 and a magnetic head 110 transmit and receive signals through a signal processing unit 190. Data which is to be recorded on a magnetic recording medium 80 by the magnetic head 110 is transmitted from the host 210 to the signal processing unit 190. The data recorded on the magnetic recording medium 80 which is read by the magnetic head 110 is transmitted to the signal processing unit 190. The read data is processed by the signal processing unit 190 and then is transmitted to the host 210.

The signal processing unit 190 has a hard disk controller (Hereinafter mentioned simply as "HDC") 220 which is used for performing an error correction, an RW channel 230 which is used for performing read/write (R/W), and a preamplifier circuit 240.

The HDC 220 includes an ECC producing circuit 221 which generates an error correction code (ECC) to be used at the time of recording data on the magnetic recording medium 80, and an ECC correcting circuit 222 which is used at the time of performing reproduction.

The RW channel 230 includes a clock producing circuit 260, a data modulating circuit 231, a recording current control circuit 232, and a recording current compensating circuit 233 as circuits which is used at the time of performing recording, and further includes a waveform equalizing circuit 234, a data detecting circuit 235, and a data demodulating circuit 236 as circuits which is used at the time of performing reproduction.

The preamplifier circuit 240 includes a recording current producing circuit 241 as a circuit which is used at the time of performing recording, and further includes a reading amplifier circuit 242 as a circuit which is used at the time of performing reproduction.

At the time of recording data on the magnetic recording medium 80 illustrated in FIG. 1B, an error correction code is added to the recording data transmitted from the host 210 by the ECC producing circuit 221 inside the HDC 220. Subsequently, the recording data to which the error correction code is added is transmitted to the RW channel 230 and is transmitted from the data modulating circuit 231 to the recording current compensating circuit 233 through the recording current control circuit 232 in synchronization with a clock signal generated by the clock producing circuit 260. The recording data is modulated by the data modulating circuit 231 into a recording data pattern in which a data error at the time of reproduction is decreased and is transmitted to the recording current control circuit 232.

The recording current control circuit 232 performs setting of the slope at a transition point of the recording current such that the signal quality or the recording density is maximum based on the recording data pattern of data to be recorded on the magnetic recording medium. In the embodiment, as illustrated in FIG. 1A, the waveform of the recording current has a first slope with respect to the time axis before the transition point and a second slope with respect to the time axis after the transition point, and the absolute value of the first slope and the absolute value of the second slope are set to be different from each other. More specifically, the embodiment has a function for setting the absolute value of the first slope to be smaller than the absolute value of the second slope.

The recording current control circuit 232 generates a recording data pattern corresponding to a current value of the recording current and transmits the recording data pattern to the recording current compensating circuit 233. A non-linear transition shift (NLTS) compensation is applied to the recording data pattern by the recording current compensating circuit 233.

Generally the "NLTS" is a phenomenon that a magnetization transition is shifted to a front side or a rear side from a position at which the magnetization transition is originally to be formed through strengthening or weakening a recording magnetic field generated from the recording head by a diamagnetic field formed from previous magnetization. In a vertical magnetic recording system, an NLTS caused by an adjacent previous magnetization transition is shifted to the rear side from the position at which the magnetization shift is to be originally formed, and, as a result, the recording bit length increases. If such a state is left uncontrolled, a great influence on the error rate occurs at the time of reading data. In order to avoid such a state, the recording current compensating circuit 233 shifts the inversion position of the recording data pattern to perform a compensation such that a bit length to be recorded on the recording medium is an ideal recording bit length.

The recording data pattern compensated using the NLTS compensation by the recording current compensating circuit 233 is transmitted to the recording current producing circuit 241 arranged inside the preamplifier circuit 240. The recording current producing circuit 241 generates a recording current in accordance with the transmitted recording data pattern. Generally, a recording current has a waveform obtained by superimposing an overshoot current in a pulse shape on a rising portion of a base recording current having a rectangular wave shape. The recording current producing circuit 241 generates a recording current by superimposing an overshoot current having a predetermined overshoot current value as an amplitude on a base recording current having a predetermined recording current value as an amplitude in accordance with the transmitted recording data pattern, basically.

When the slope at the transition point is set by the recording current control circuit 232, the recording current producing circuit 241 generates a recording current by using the predetermined current value as a base. For example, when a predetermined slope is designated by the recording current control circuit 232, the recording current producing circuit 241 generates a recording current as illustrated in FIG. 1A in accordance with a rise time or a fall time set by the recording current control circuit 232. As described below, the recording current control circuit 232 may have a function for setting a recording current value and an overshoot current value.

In the embodiment, the recording current control circuit 232 includes a data pattern detecting unit 271 which detects data to be recorded on the magnetic recording medium 80 in advance. In accordance with a pattern of recording data detected by the data pattern detecting unit 271, a recording current can be generated by changing a first slope S1 of a current waveform of the recording current by using the waveform slope control unit 272.

For example, in accordance with the pattern of the recording data detected by the data pattern detecting unit 271, the waveform slope control unit 272 receives a value of a time to at which changing the slope $S_1$ of the current waveform is started and a value of a time $t_3$ at which the slope $S_1$ of the current waveform is ended. From values of the times $t_0$, $t_3$, a predetermined period nT of the slope of the current waveform and a current amplitude value A at the time to directly before starting changing the slope of the current waveform can be obtained by calculation. "n" is a number of continuous data of recording information before the changing. The waveform slope control unit 272 produces a current amplitude value I expressed by the following formula in series based on the predetermined period nT and the current amplitude value A, with time passing from the time $t_0$ to the time $t_3$ in the predetermined period nT of the slope of the current waveform, $$I=A(1-t/nT)$$

Such a current amplitude value I can be realized easily by using an analogue circuit or software.

The recording current compensating circuit 233 may include an inversion position detecting unit 273 which detects a bit inversion position of data to be recorded on the magnetic recording medium 80. The inversion position of the recording data pattern is shifted in the phase shifting unit 274 using a detection signal detected by the inversion position detecting unit 273. By shifting the inversion position, the phase of the recording current can be shifted such that the bit length on the recording medium 80 is a desirable recording bit length. Such a means to shift the phase of the recording current is well-known.

The recording current control circuit 232 may have a function of setting a recording current value and an overshoot current value. More specifically, a data pattern detecting unit 271 detects a recording bit length of data pattern to be recorded on the magnetic recording medium 80. In accordance with the detected recording bit length, the overshoot amount changing unit 276 can change an overshoot amount. Such a means to change the overshoot amount is disclosed in U.S. Pat. No. 6,493,161, for example.

The recording current is output from the recording current producing circuit 241 and is received by the magnetic head 110.

This recording current can be detected, for example, by performing measurement at a signal output portion 300 of the recording current producing circuit 241.

The recording current producing circuit 241 supplies the generated recording current to a coil (an exciting coil) 20 of the recording/reproducing head i.e. the magnetic head 110 shown in FIG. 11. A change in the recording current is converted into a change in the magnetic field by the coil 20 of the recording/reproducing head 110, and the recording data pattern is recorded on the recording medium.

At the time of reproduction, a leakage magnetic field which leaks from a recording magnetic layer of the recording medium 80 is read as a change in resistance by a magnetic field sensitive element (not illustrated in the drawing) of the recording/reproducing head 110. The read reproduction waveform is transmitted to the waveform equalizing circuit 234 and the data detecting circuit 235 arranged inside the RW channel 230 through the reading amplifier circuit 242 arranged inside the preamplifier circuit 240. The combination of the waveform equalizing circuit 234 and the data detecting circuit 235 is known as a partial-response maximum-likelihood (PRML) circuit. The waveform equalizing circuit 234 equalizes the reproduction waveform into a waveform having desired characteristics by using a filter etc., and then the data detecting circuit 235 detects data with a maximum likelihood. In the data demodulating circuit 236, the detected data is processed in reverse to the processing in the data modulating circuit 231. Then, the ECC correcting circuit 222 in the HDC 220 performs data error detection and a correction processing for the processed data, and resultant data is transmitted to the host 210. In this way, the host 210 can read recording data recorded on the magnetic recording medium 80.

Figure 12:
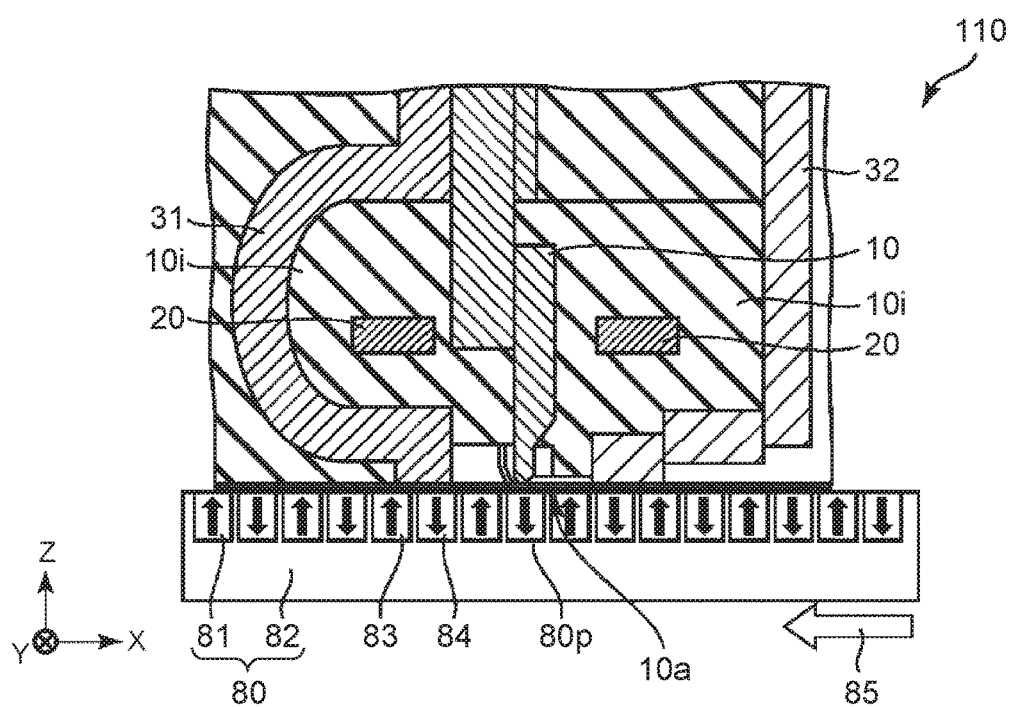
FIG. 12 is an enlarged cross-sectional view which illustrates a part of the magnetic recording and reproducing device according to the embodiment schematically.

FIG. 12 is a cross-sectional view which schematically illustrates a part of the magnetic recording and reproducing device according to the embodiment in an enlarged scale.

FIG. 12 illustrates specific configurations of the magnetic head 110 and the magnetic recording medium 80 illustrated in FIG. 1B. The magnetic head 110 includes a magnetic pole 10, a coil 20, a first shield 31, a second shield 32, and an insulating portion 10i. Between the first shield 31 and the second shield 32, the magnetic pole 10 and the coil 20 are disposed. The insulating portion 10i are provide among the magnetic pole 10, the coil 20, the first shield 31 and the second shield 32, and covers at least portions of the magnetic pole 10, the coil 20, the first shield 31 and the second shield 32, for example.

The magnetic head 110 is arranged to face the magnetic recording medium 80. The magnetic head 110 has an air bearing surface (ABS) which is a medium facing surface 10a. Magnetic fluxes generated from the magnetic pole 10 are applied to the magnetic recording medium 80, and information is recorded on the magnetic recording medium 80.

One direction perpendicular to the Z-axis direction is an X-axis direction. A direction perpendicular to the Z-axis direction and the X-axis direction is a Y-axis direction.

A track width direction i.e. the Y-axis direction is substantially parallel to the medium facing surface 10a. The magnetic recording medium 80 includes a medium board 82 and a magnetic recording layer 81, for example. The magnetic recording layer 81 is provided on the medium board 82. In the magnetic recording layer 81, a plurality of recording bits 84 are provided. The magnetic recording medium 80 moves relatively with respect to the magnetic head 110 along a medium moving direction 85. The medium moving direction 85 may be along the X-axis direction. In the magnetic head 110, a reproduction portion (not illustrated in FIG. 12) for detecting the direction of magnetization 83 may be further provided.

Figure 13:
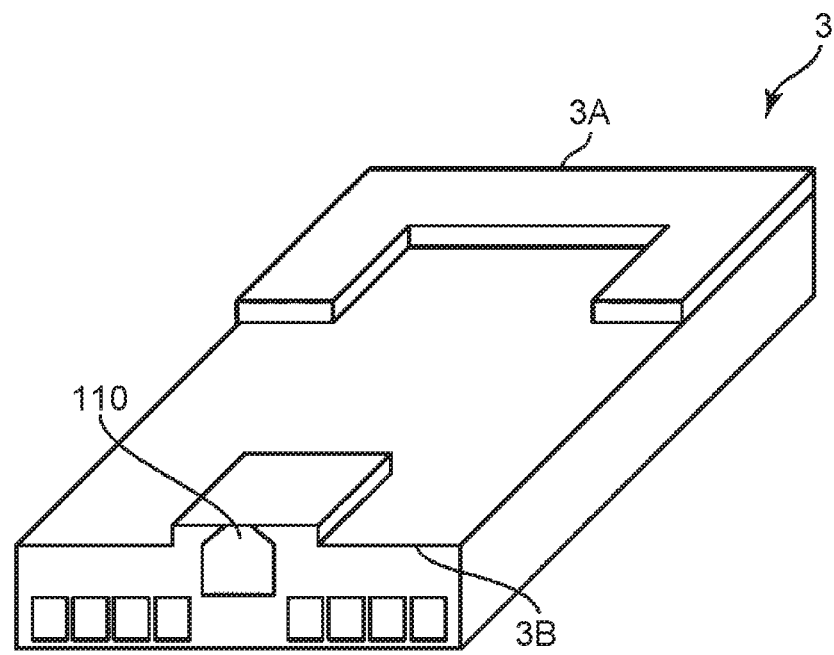
FIG. 13 is an enlarged perspective view which illustrates a part of the magnetic recording and reproducing device according to the embodiment schematically.

FIG. 13 is a schematic perspective view which illustrates a part of the magnetic recording and reproducing device according to the embodiment in an enlarged scale.

FIG. 13 illustrates a specific configuration of the head slider 3 illustrated in FIG. 1B in which the magnetic head 110 is mounted.

The head slider 3 may be formed using $Al_2O_3/TiC$. The head slider 3 moves relatively with respect to the magnetic recording medium 80 while floating above or being in contact with the magnetic recording medium 80.

The head slider 3 is provided with an air inflow side part 3A and an air outflow side part 3B. The magnetic head 110 is arranged on a side face of the air outflow side part 3B of the head slider 3. In this way, the magnetic head 110 mounted in the head slider 3 moves relatively with respect to the magnetic recording medium 80 while floating above or being in contact with the magnetic recording medium 80.

Figure 14:
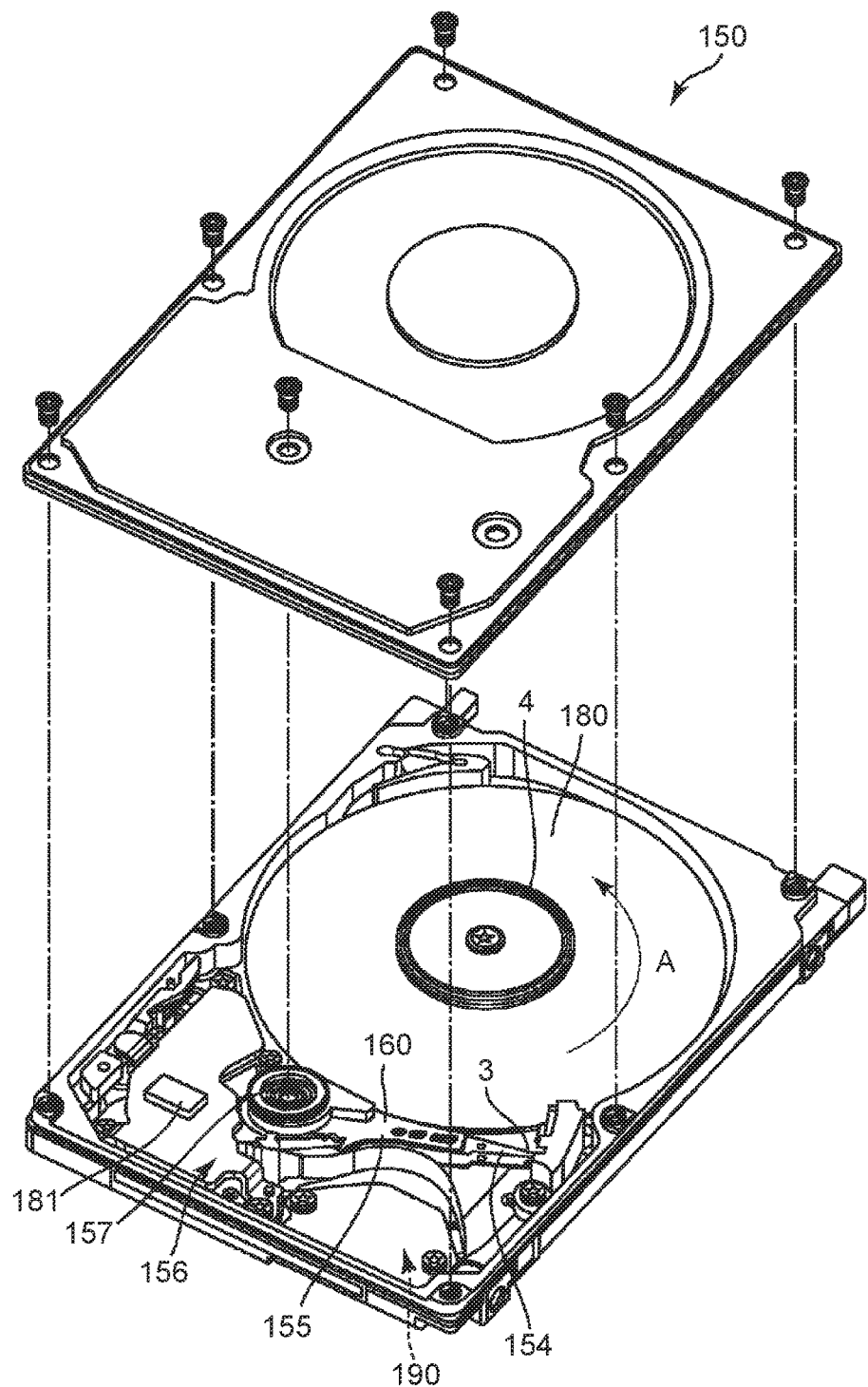
FIG. 14 is an enlarged exploded perspective view which illustrates the magnetic recording and reproducing device according to the embodiment.

FIG. 14 is an exploded perspective view which illustrates the magnetic recording and reproducing device according to the embodiment in an enlarged scale.

As illustrated in FIG. 14, the magnetic recording and reproducing device 150 according to the embodiment is a device in a form using a rotary actuator. A recording disk 180 is mounted in a spindle motor 4 and is rotated in the direction of an arrow A by the spindle motor 4 responding to a control signal transmitted from a position control unit (not illustrated in FIG. 14).

The magnetic recording and reproducing device 150 according to the embodiment may be provided with a plurality of recording disks. The magnetic recording and reproducing device 150 may be a hybrid hard disk drive (hybrid HDD) including a recording medium 181. The recording medium 181 may be a solid state drive (SSD). A nonvolatile memory such as a flash memory is used in the recording medium 181.

The head slider 3 which performs recording and reproducing of information stored in the recording disk 180 has the configuration shown in FIG. 13 and is attached to the tip end of a suspension 154 having a thin film shape. Near the tip end of the head slider 3, the magnetic head 110 illustrated in FIG. 12 is mounted.

When the recording disk 180 is rotated, a pushing pressure by the suspension 154 and a pressure generated on the medium facing surface 10A of the head slider 3 are balanced. Accordingly, the medium facing surface 10A of the head slider 3 is maintained to have a predetermined floating amount from the surface of the recording disk 180. The magnetic recording and reproducing device 150 may be a so-called "contact running type" in which the head slider 3 is in contact with the recording disk 180.

The head slider 3A having the magnetic head 110 of FIG. 13 is mounted at one end of the suspension 154, and the other end of the suspension 154 is connected to one end of an arm 155 such as an actuator arm. The arm 155 has a bobbin part which holds a driving coil. At the other end of the arm 155, a voice coil motor 156 which is one type of linear motor is disposed. The voice coil motor 156 may have the driving coil 162 which is wound up around the bobbin part of the arm 155 and which is described in detail below, and a magnetic circuit including a permanent magnet and a yoke facing each other and arranged to sandwich the driving coil.

The arm 155 is held by ball bearings disposed at two upper and lower portions of the bearing part 157 and can perform rotary movement arbitrarily by using the voice coil motor 156. Accordingly, the magnetic head can be moved to an arbitrary position above the recording disk 180. A head stack assembly 160 is provided with a head gimbal assembly 158 described below and a bearing part 157. The head gimbal assembly 158 has an arm 155, a suspension 154, and a head slider 3, and is a magnetic head assembly. In the magnetic recording and reproducing device 150, the signal processing unit 190 illustrated in FIG. 11 is provided.

Figure 15A:
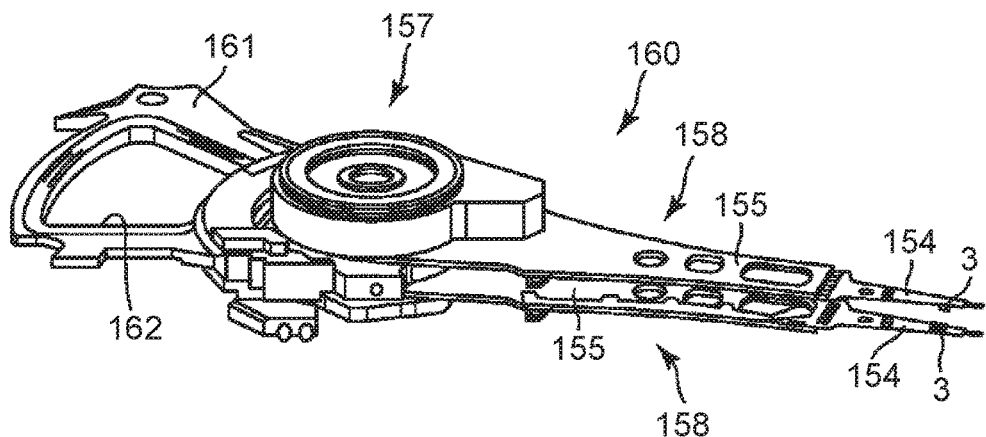
FIGS. 15A and 15B are enlarged perspective views which respectively illustrate a head stack assembly and a magnetic head assembly.
Figure 15B:
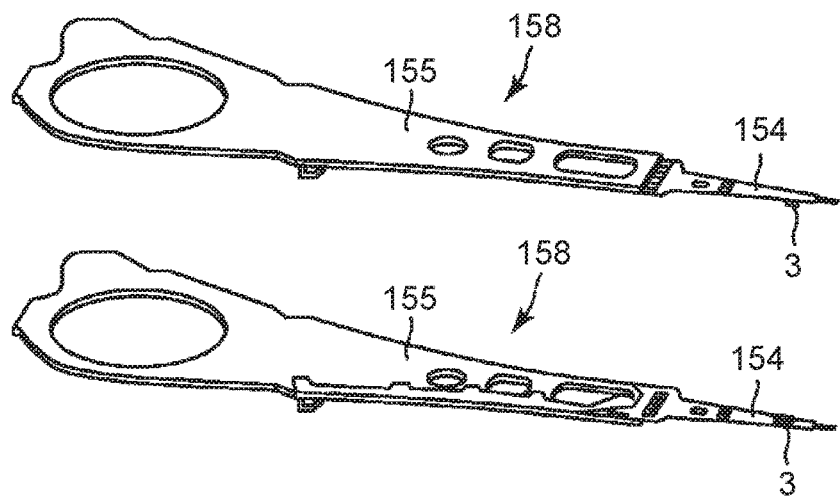

FIG. 15A is a perspective view which illustrates the head stack assembly of the magnetic recording and reproducing device according to the embodiment in an enlarged scale. FIG. 15B is a perspective view of the magnetic head assembly.

FIG. 15B is an enlarged perspective view which specifically illustrates the head gimbal assembly 158 of FIG. 1B which is a magnetic head assembly. The head gimbal assembly 158 is a part of the head stack assembly 160.

As illustrated in FIG. 15A, the head stack assembly 160 includes the bearing part 157 illustrated in FIG. 14, the head gimbal assembly 158, and a support frame 161. The head gimbal assembly 158 extends from the bearing part 157. The support frame 161 extends from the bearing part 157 in a direction opposite to the head gimbal assembly 158. The support frame 161 supports the driving coil 162 of the voice coil motor 156.

As illustrated in FIG. 15B, the head gimbal assembly 158 includes an arm 155 extending from the bearing part 157, and a suspension 154 extending from the arm 155.

At the tip end of the suspension 154, the head slider 3 is attached. The magnetic head 110 according to the embodiment is mounted in the head slider 3.

At one end of the suspension 154, the head slider 3 is mounted, and the arm 155 is connected to the other end of the suspension 154.

The suspension 154 has lead wires (not illustrated in FIG. 15B) which are used for transmitting recording and reproducing signals, heating a heater and driving a spin torque oscillator. The heater is used to adjust the floating amount of the header slider. The lead wires which are used for transmitting recording and reproducing signals and electrodes of the magnetic head 110 provided in the head slider 3 are electrically connected.

Input/output lines of the signal processing unit 190 are connected to electrode pads of the head gimbal assembly 158 and are electrically connected to the magnetic head 110.

In this way, the magnetic recording and reproducing device 150 includes a moving unit which enables the magnetic recording medium 80 and the magnetic head 110 to move relatively, in a state in which the magnetic recording medium 80 and the magnetic head 110 are positioned with a distance from each other or in a contacting state.

In addition, the magnetic recording and reproducing device 150 includes the position control unit which performs positioning of the magnetic head 110 at a predetermined recording position on the magnetic recording medium 80, and a signal processing unit 190 which records a signal on the magnetic recording medium 80 or reproduces a signal from the magnetic recording medium 80 by using the magnetic head 110.

The recording disk 180 may be used as the magnetic recording medium 80. The above moving unit may include the head slider 3. The position control unit may include the head gimbal assembly 158.

The magnetic recording and reproducing device according to the embodiment includes a magnetic recording medium on which magnetic data is recorded, a magnetic head which records magnetic data on the magnetic recording medium based on a recording current, and a recording current output unit which supplies the recording current to the magnetic head. The waveform of the recording current has a first slope for a first period in which data of first information is continuously recorded and has a second slope for a second period following the first period in which the data is switched to another data of second information and the latter data is recorded. The value of the first slope and the value of the second slope are different from each other.

In the magnetic recording and reproducing device configured as described above, the degradation of the responsiveness of the recording head can be suppressed. Accordingly, even in an information transmission condition of a high level, a high quality recording can be expected to be performed. Particularly, such an improvement effect becomes remarkable by setting the slope of the falling portion of the recording current with respect to the time axis to be smaller than that of the rising portion.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. A form which is obtained by combining two or more elements among the elements of the embodiments also belongs to the scope of the present invention as long as the spirit of the invention is included in the form.

What is claimed is:

1. A magnetic recording and reproducing device comprising:
   a magnetic recording medium on which magnetic data is recorded;
   a magnetic head which records the magnetic data on the magnetic recording medium;
   a recording current output unit which supplies a recording current to the magnetic head so as to magnetize the magnetic head;
   an inversion position detecting unit which detects a bit inversion position of a data pattern to be recorded on the magnetic recording medium; and
   a phase shifting unit which shifts a phase of the recording current in accordance with a detected bit inversion position in a case where the bit inversion position of the data is detected,
   wherein a waveform of the recording current has a first slope for a first period to record a plurality of data of first information continuously, and a second slope for a second period following the first period to switch the data to data of second information and to record the data of the second information, and the first slope and the second slope are different from each other.

2. The magnetic recording and reproducing device according to claim 1, wherein a continuous interval of the first information in the first period is longer than an interval of the second information in the second period to record the second information.

3. The magnetic recording and reproducing device according to claim 1, further comprising:
   a data pattern detecting unit which detects a predetermined pattern of data to be recorded on the magnetic recording medium; and
   a waveform slope control unit which can change the degree of the first slope in accordance with the detected data pattern.

4. The magnetic recording and reproducing device according to claim 1, further comprising:
   a data pattern detecting unit which detects a predetermined recording bit length of a data pattern to be recorded on the magnetic recording medium; and
   an overshoot amount changing unit which changes an overshoot amount in accordance with the detected recording bit length in a case where the predetermined recording bit length is detected.

5. A magnetic recording and reproducing device, comprising:
   a magnetic recording medium on which magnetic data is recorded;
   a magnetic head which records the magnetic data on the magnetic recording medium;
   a recording current output unit which supplies a recording current to the magnetic head so as to magnetize the magnetic head;
   an inversion position detecting unit which detects a bit inversion position of a data pattern to be recorded on the magnetic recording medium; and
   a phase shifting unit which shifts a phase of the recording current in accordance with a detected bit inversion position in a case where the bit inversion position of the data is detected,
   wherein a waveform of the recording current has a first slope for a first period to record a plurality of data of first information continuously, and a second slope for a second period following the first period to switch the data to data of second information and to record the data of the second information, the first slope and the second slope are different from each other, and an absolute value of the first slope is smaller than an absolute value of the second slope.

6. The magnetic recording and reproducing device according to claim 5, wherein a continuous interval of the first information in the first period is longer than that of the second information in the second period to record the second information.

7. The magnetic recording and reproducing device according to claim 5, further comprising:
   a data pattern detecting unit which detects a predetermined pattern of data to be recorded on the magnetic recording medium; and
   a waveform slope control unit which can change the degree of the first slope in accordance with the detected data pattern.

8. The magnetic recording and reproducing device according to claim 5, further comprising:
   a data pattern detecting unit which detects a predetermined recording bit length of a data pattern to be recorded on the magnetic recording medium; and
   an overshoot amount changing unit which changes an overshoot amount in accordance with the detected recording bit length in a case where the predetermined recording bit length is detected.

9. A method of controlling a magnetic recording and reproducing device, comprising:
   outputting a recording current having a first slope for a first period to record a plurality of data of first information continuously, and a second slope for a second period following the first period to record data of second information, the first slope and the second slope being different from each other; and
   recording the data on a magnetic recording medium by using a magnetic head which receives the recording current,
   wherein, before outputting the recording current, a bit inversion position of a data pattern to be recorded on the magnetic recording medium is detected and a phase of the recording current is shifted in accordance with a detected bit inversion position in a case where the bit inversion position of the data is detected.

10. The method according to claim 9, wherein an absolute value of the first slope is smaller than an absolute value of the second slope.

11. The method according to claim 9, wherein a continuous interval of the first information in the first period is longer than an interval of the second information in the second period.

12. The method of controlling a magnetic recording and reproducing device according to claim 9,
   wherein, before outputting the recording current, a predetermined recording bit length of data pattern to be recorded on the magnetic recording medium is detected and the degree of the first slope in accordance with the detected data pattern.

13. The method of controlling a magnetic recording and reproducing device according to claim 9,
   wherein, before outputting the recording current, a predetermined recording bit length of a data pattern to be recorded on the magnetic recording medium is detected and an overshoot amount is changed in accordance with the detected recording bit length in a case where the predetermined recording bit length is detected.

* * * * *